(12) United States Patent
Li et al.

(10) Patent No.: US 9,835,213 B2
(45) Date of Patent: Dec. 5, 2017

(54) ACTUATOR FOR AN ELECTRIC PARKING BRAKE SYSTEM

(71) Applicant: Johnson Electric S.A., Murten (CH)

(72) Inventors: Li Nan Li, Shenzhen (CN); Fa Yun Andreas Qi, Shenzhen (CN); Rui Feng Qin, Hong Kong (CN)

(73) Assignee: JOHNSON ELECTRIC S.A., Murten (CH)

( * ) Notice: Subject to any disclaimer, the term of this patent is extended or adjusted under 35 U.S.C. 154(b) by 0 days.

(21) Appl. No.: 15/147,533

(22) Filed: May 5, 2016

(65) Prior Publication Data
US 2016/0327104 A1 Nov. 10, 2016

(30) Foreign Application Priority Data
May 5, 2015 (CN) .......................... 2015 1 0225127

(51) Int. Cl.
*B60L 7/00* (2006.01)
*F16D 65/00* (2006.01)
*F16D 65/18* (2006.01)
*F16D 121/24* (2012.01)
*F16D 125/50* (2012.01)

(52) U.S. Cl.
CPC ......... *F16D 65/0006* (2013.01); *F16D 65/18* (2013.01); *F16D 2121/24* (2013.01); *F16D 2125/50* (2013.01)

(58) Field of Classification Search
CPC ...... B60T 13/746; B60T 11/046; B60T 7/085; B60T 7/122; F16D 65/0006; F16D 65/18; F16D 2121/24

USPC ......................................... 188/156–164, 2 D
See application file for complete search history.

(56) References Cited

U.S. PATENT DOCUMENTS

| | | | |
|---|---|---|---|
| 6,736,233 B2 | 5/2004 | Beishline et al. | |
| 6,978,870 B2* | 12/2005 | Powrozek | B60T 7/107 188/1.11 R |
| 7,021,415 B2* | 4/2006 | Farmer | B60T 13/741 180/275 |
| 7,284,648 B2* | 10/2007 | Reed | F16H 57/031 192/219.5 |
| 8,186,488 B2* | 5/2012 | Poertzgen | B60T 13/746 188/162 |
| 2012/0325601 A1* | 12/2012 | Giering | F16D 65/0006 188/162 |

(Continued)

*Primary Examiner* — Christopher Schwartz
(74) *Attorney, Agent, or Firm* — Muncy, Geissler, Olds & Lowe PC

(57) ABSTRACT

An actuator for an electric parking brake system includes an outer housing, a motor, a planetary gear mechanism and a belt-wheel mechanism that are received in the outer housing, and an isolation member. The belt-wheel mechanism includes a driving wheel, a follower wheel, and a transmission belt. The driving wheel is connected with the motor. The follower wheel is connected with the planetary gear mechanism. The isolation member has a first spacer fixed to the driving wheel via the motor, a second spacer fixed to the follower wheel, and a buffering element disposed between the second spacer and the outer housing. The second spacer is disposed above and assembled to the first spacer. The isolation member defines the center-to-center distance between the driving wheel and the follower wheel, and absorbs vibrations from the motor and the planetary gear mechanism.

15 Claims, 10 Drawing Sheets

(56) References Cited

U.S. PATENT DOCUMENTS

| | | | |
|---|---|---|---|
| 2013/0203554 A1* | 8/2013 | Dettenberger | F16D 65/28 475/343 |
| 2015/0075923 A1* | 3/2015 | Jang | H02K 7/116 188/162 |
| 2015/0210253 A1* | 7/2015 | Qi | B60T 13/741 188/162 |
| 2016/0223040 A1* | 8/2016 | Watzek | F16D 65/50 |

* cited by examiner

ACTUATOR FOR AN ELECTRIC PARKING BRAKE SYSTEM

CROSS REFERENCE TO RELATED APPLICATIONS

This non-provisional patent application claims priority under 35 U.S.C. §119(a) from Patent Application No. 201510225127.8 filed in The People's Republic of China on May 5, 2015, the entire contents of which are hereby incorporated by reference.

FIELD OF THE INVENTION

This invention relates to an electric parking brake system, and in particular to an actuator for the electrical parking brake system.

BACKGROUND OF THE INVENTION

Vehicles are generally equipped with a parking brake system for keeping the vehicle motionless when it is parked. The traditional parking brake system is hand-operated and thus named "handbrake". In order to start a car equipped with the handbrake on a slope, the driver needs to manually release the handbrake and, at the same time, operate the accelerator and clutch. The handbrake-equipped car requires the driver to have a high driving skill.

With the development of technology, electric parking brake (EPB) systems have been gradually replacing the traditional manually operated handbrakes. The existing EPB system includes an electric actuator which drives calipers and brake pads to brake the car. The actuator usually includes a motor for providing the driving force and a speed-reduction transmission mechanism through which the high speed rotation of the motor is greatly decreased and the torque is increased. A typical speed-reduction transmission mechanism includes components such as worms and worm wheels, gears and transmission belts. The transmission belt, which can prevent the transmission of vibrations between the components connected at opposite ends of the belt thus reducing noises, are widely used in the actuators of vehicles. However, vibrations of components, such as the motor, in the actuator can still be transmitted outwards through other peripheral components. As a result, the actuator still generates a certain level of noise during operation.

Hence there is a desire for an actuator for an electric parking brake system which can effectively reduce noise.

SUMMARY OF THE INVENTION

Accordingly, in one aspect thereof, the present invention provides an actuator of an electric parking brake system, comprising: an outer housing; motor received in the outer hosing: a planetary gear mechanism received in the outer housing; and a belt-wheel mechanism, disposed in the outer housing and connecting the planetary gear mechanism with the motor, the belt-wheel mechanism comprising: a driving wheel connected to the motor; a follower wheel spaced from the driving wheel and connected with the planetary gear mechanism; a transmission belt extending around the driving wheel and the follower wheel; and an isolation member comprising a first spacer, a second spacer, and a buffering element, the first spacer being fixed relative to a central axis of the driving wheel, the second spacer being fixed relative to a central axis of the follower wheel, the second spacer being disposed above and assembled to the first spacer in an axial direction, and the buffering element being disposed between the second spacer and the outer housing.

Preferably, the first spacer includes a base plate fixed to the motor and locking arms extending from the base plate toward the second spacer, the second spacer includes locking legs extending toward the first spacer, the locking legs and the locking arms are engaged to position the first spacer relative to the second spacer.

Preferably, the second spacer includes a spacing portion and a connecting portion, the connecting portion includes a body and the locking legs extend from the body, and the spacing portion is disposed overlapping the follower wheel.

Preferably, the driving wheel of the belt-wheel mechanism is received between the base plate of the first spacer and the body of the second spacer, the locking legs and locking arms are spaced about the driving wheel, and the transmission belt passes between two adjacent locking legs/locking arms to extend around the driving wheel and the follower wheel.

Preferably, the buffering element includes a plate portion laying on the spacing portion and blocking portions disposed on the body, the body being ring shaped, and the blocking portions are arranged spaced apart in a circumferential direction of the body.

Preferably, the blocking portions are connected by a line portion, and the body forms a line slot in which the line portion is embedded.

Preferably, the motor includes a shaft, the shaft passes through a housing of the motor to connect with the driving wheel of the belt-wheel mechanism, the base plate defines a through hole at a center thereof through which the shaft passes, one of the base plate and the housing of the motor is formed with a recess, and the other of the base plate and the housing of the motor is formed with a protruding block which engages the recess.

Preferably, an output wheel is embedded in the follower wheel, the output wheel is connected with the planetary gear mechanism through a pivot axle, a top end of the pivot axle passes through the output wheel and is disposed within the spacing portion of the second spacer, a protrusion protrudes outwardly from an area of the spacing portion corresponding to the output wheel, the plate portion of the buffering element forms a boss corresponding to the protrusion, and the boss completely covers the protrusion.

Preferably, the follower wheel is a hollow structure including a circular-disc shaped end plate and a sidewall extending axially from an edge of the end plate, the transmission belt surrounds the sidewall, one end of the output wheel is inserted into the end plate, the other end of the output wheel extends into an inside of the sidewall, the other end of the output wheel has an outer diameter less than an inner diameter of the sidewall, with an annular space defined there between, the planetary gear mechanism partially extends into the annular space to engage with the output wheel.

Preferably, the output wheel forms a sun gear of the planetary gear mechanism.

Preferably, the locking arms form insertion slots, and the locking legs are inserted into the insertions slots of the locking arms.

Alternatively, the locking legs form insertion slots, and the locking arms are inserted into the insertions slots of the locking legs.

Preferably, the transmission belt is a tooth belt, the follower wheel and driving wheel each have a number of teeth that engage the transmission belt, and the number of teeth of the driving wheel is less than the number of teeth of the follower wheel.

Preferably, the buffering element is integrally formed with the second spacer.

Preferably, the buffering element is molded to the second spacer.

In comparison with the prior art, in the actuator of the EPB system of the present invention, transmission of the motor and the planetary gear mechanism is achieved by a belt-wheel mechanism. In addition, the belt-wheel mechanism includes the isolation member for defining the center-to-center distance between the driving wheel and the follower wheel, and for absorbing the vibrations from the motor and the planetary gear mechanism, thus preventing the vibrations from being transmitted to the outer housing. The actuator can operate stably and with low noise, and is simple in structure and easy to assemble.

BRIEF DESCRIPTION OF THE DRAWINGS

A preferred embodiment of the invention will now be described, by way of example only, with reference to figures of the accompanying drawings. In the figures, identical structures, elements or parts that appear in more than one figure are generally labeled with a same reference numeral in all the figures in which they appear. Dimensions of components and features shown in the figures are generally chosen for convenience and clarity of presentation and are not necessarily shown to scale. The figures are listed below.

DETAILED DESCRIPTION OF THE PREFERRED EMBODIMENTS

Figure 1:
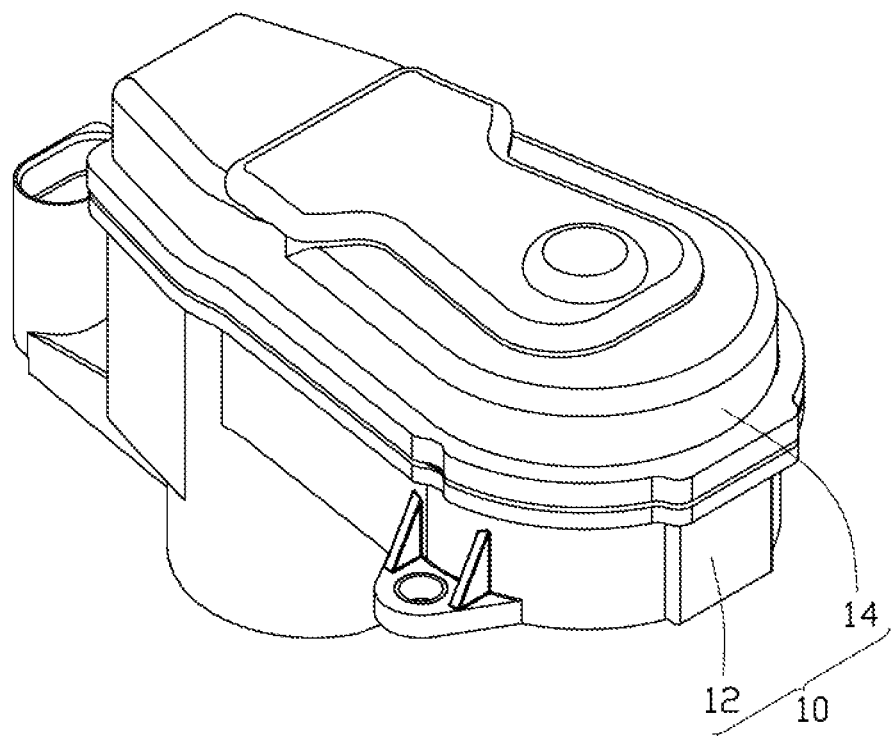
FIG. 1 is an assembled view of an actuator for an EPB system in accordance with a preferred embodiment of the present invention.
Figure 2:
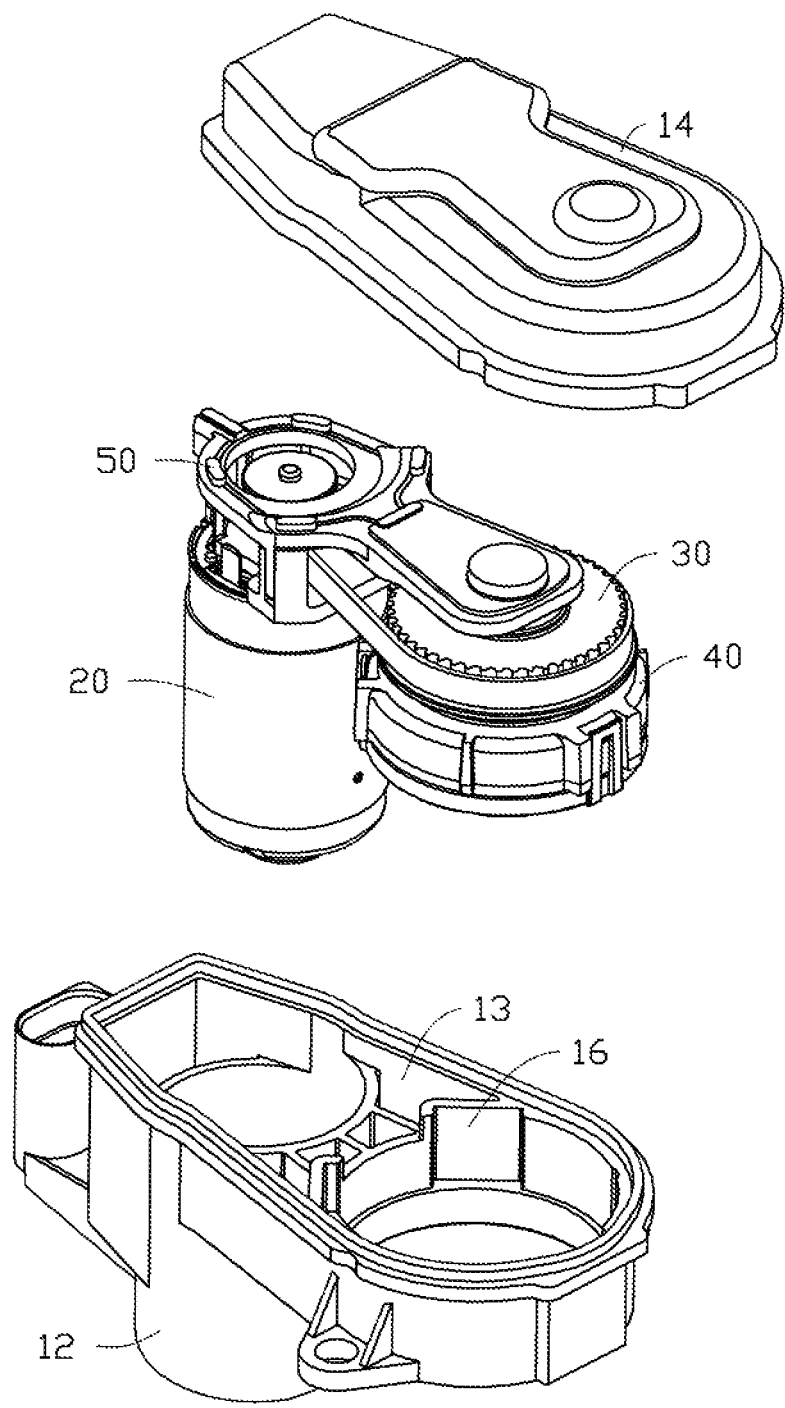
FIG. 2 is an exploded view of the actuator of FIG. 1.

Referring to FIG. 1 and FIG. 2, an actuator, of an electric parking brake (EPB) system, according to the present invention includes an outer housing. A motor 20, a belt-wheel mechanism 30, a planetary gear mechanism 40, and an isolation member 50 are disposed in the outer housing 10. The outer housing 10 includes a housing base 12 and a top cover 14 connected to a top side of the housing base 12. The top cover 14 and the housing base 12 cooperatively form a receiving space 13 for receiving the motor 20, belt-wheel mechanism 30, planetary gear mechanism 40, and isolation member 50. The motor 20 acts as a driving member for outputting a torque. The belt-wheel mechanism 30 and the planetary gear mechanism 40 cooperatively form a speed reduction transmission which converts the high speed rotation of the motor 20 into low speed rotation. The isolation member 50 is used to isolate vibrations of the motor 20 and planetary gear mechanism 40, preventing them from being transmitted to the outer housing 10. The motor 20 and planetary gear mechanism 40 are arranged side by side. The belt-wheel mechanism 30 is located above the motor 20 and the planetary gear mechanism 40 and connects the motor 20 with the planetary gear mechanism 40 to transmit the rotation of the motor 20 to the planetary gear mechanism 40 with reduced speed.

Figure 3:
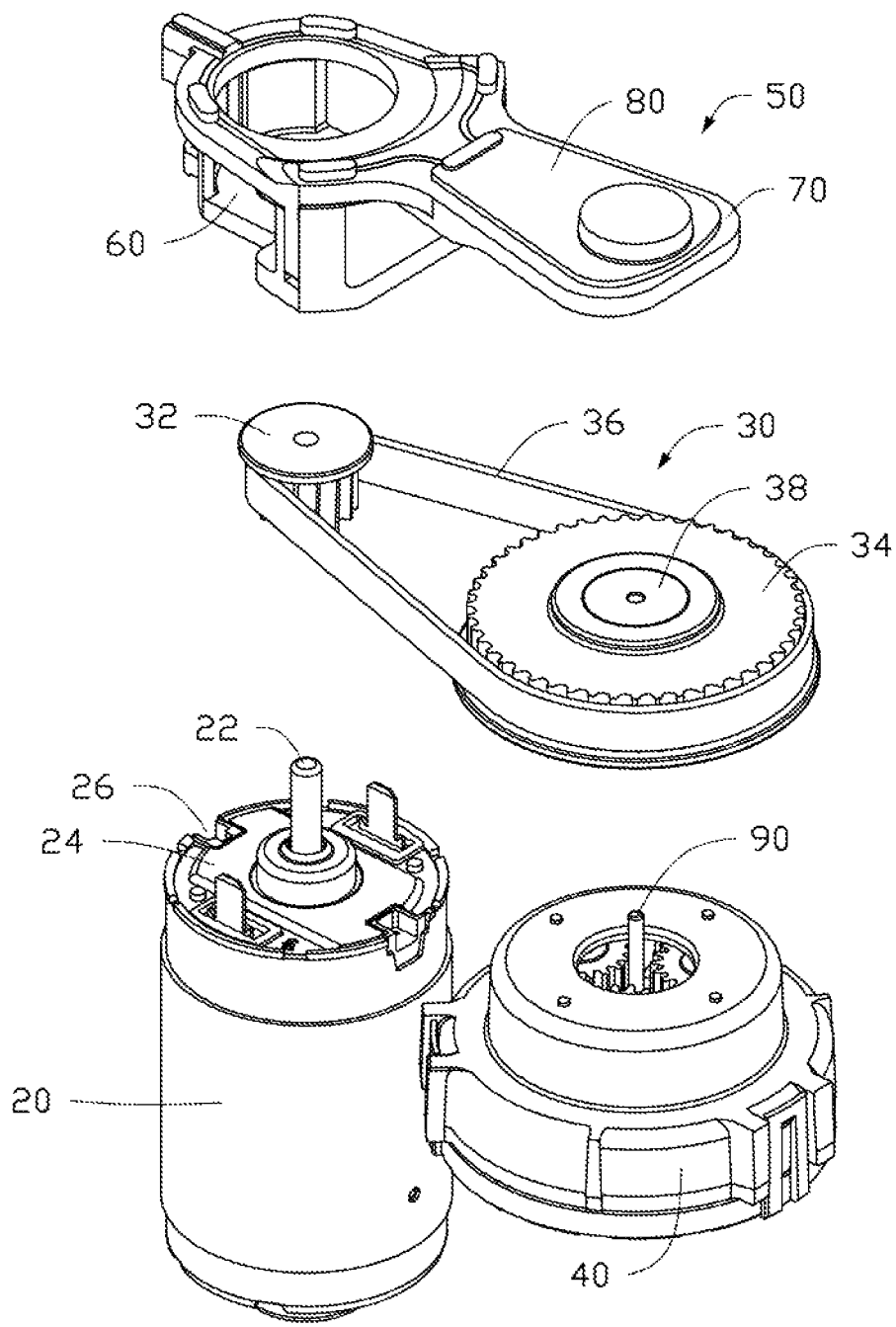
FIG. 3 is a further exploded view of the actuator of FIG. 1, with an outer housing omitted.
Figure 4:
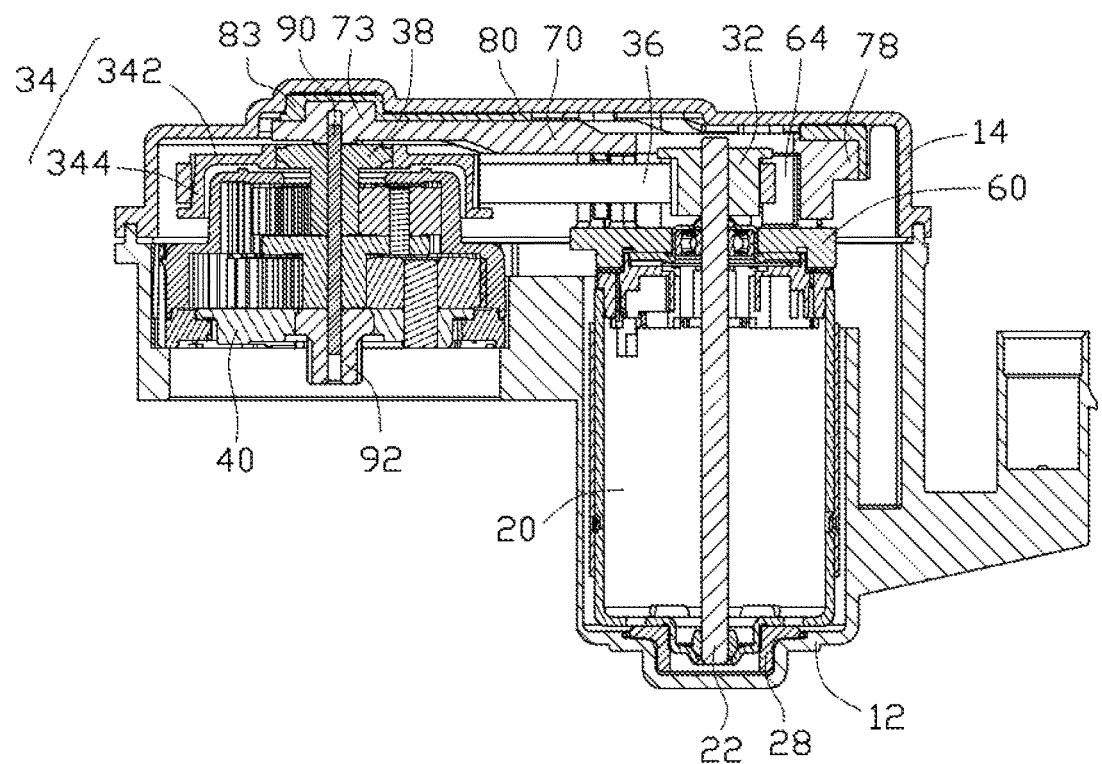
FIG. 4 is a sectional view of the actuator of FIG. 1.

Also referring to FIG. 3 and FIG. 4, the motor 20 includes a shaft 22 which is able to rotate. The shaft 22 includes a top end extending out of an end cap 24 of the motor 20 to connect with the belt-wheel mechanism 30. The motor 20 has a recess 26 in a circumferential edge of the end cap 24, for positioning the isolation member 50. In this embodiment, there are two recesses 26 that are symmetrically arranged. In order to prevent the vibrations of the motor 20 during operation from being transmitted to the outer housing 10, a gasket 28 is disposed between a bottom of the motor 20 and the housing base 12. The gasket 28 may be made of a rubber material.

The belt-wheel mechanism 30 includes a driving wheel 32, a follower wheel 34, and a transmission belt 36 extending around the driving wheel 32 and the follower wheel 34. The follower wheel 34 and the driving wheel 32 are both gears that are spaced apart by a distance and transmission there between is achieved by the transmission belt 36. The transmission belt 36 may be a tooth belt which meshes with the driving wheel 32 and the follower wheel 34. The driving wheel 32 is fixedly attached to the shaft 22 of the motor 20 to rotate with the shaft 22. The follower wheel 34 is drivingly connected with the planetary gear mechanism 40. A diameter and number of teeth of the driving wheel 32 are far less than those of the follower wheel 34, such that, when the driving wheel 32 rotates at high speed with the shaft 22 of the motor 20, the follower wheel 34 is driven through the belt-transmission 36 to rotate at a relatively low speed. In particular, a ratio of a rotational speed V2 of the follower wheel 34 to a rotational speed V1 of the driving wheel 32 is equal to a ratio of the number of teeth N1 of the driving wheel 32 to the number of teeth N2 of the follower wheel 34, i.e. V2/V1=N1/N2.

An output wheel 38 is disposed in a middle of the follower wheel 34 of the belt-wheel mechanism 30. The output wheel 38 is coaxially disposed with and fixed to the follower wheel 34. Upon rotation of the follower wheel 34, the output wheel 34 rotates with the follower wheel 34. In this embodiment, referring also to FIG. 2, the follower wheel 34 is a hollow cylinder with one open end, which includes a circular-disc shaped end plate 342 and a sidewall 344 extending perpendicularly downward from an outer edge of the end plate 342. Teeth of the follower wheel 34 are formed on an outer surface of the sidewall 344. The transmission belt 36 sleeves around the sidewall 344. A top end of the output wheel 38 is embedded in and fixedly connected to the middle of the end plate 342 of the follower wheel 34, such that relative rotation there between is prevented. A bottom end of the output wheel 38 extends out of the end plate 342 to an inside of the sidewall 344 to drivingly connect with the planetary gear mechanism 40 so as to transmit the torque of the motor 20 to the planetary gear mechanism 40. The bottom end of the output wheel 38 is a gear structure having an outer diameter far less than an inner diameter of the sidewall 344, such that an annular space is formed between the bottom end of the output wheel 38 and the sidewall 344 of the follower wheel 34. The output wheel 38 forms the input sun gear driving the planetary gear mechanism 40.

Figure 5:
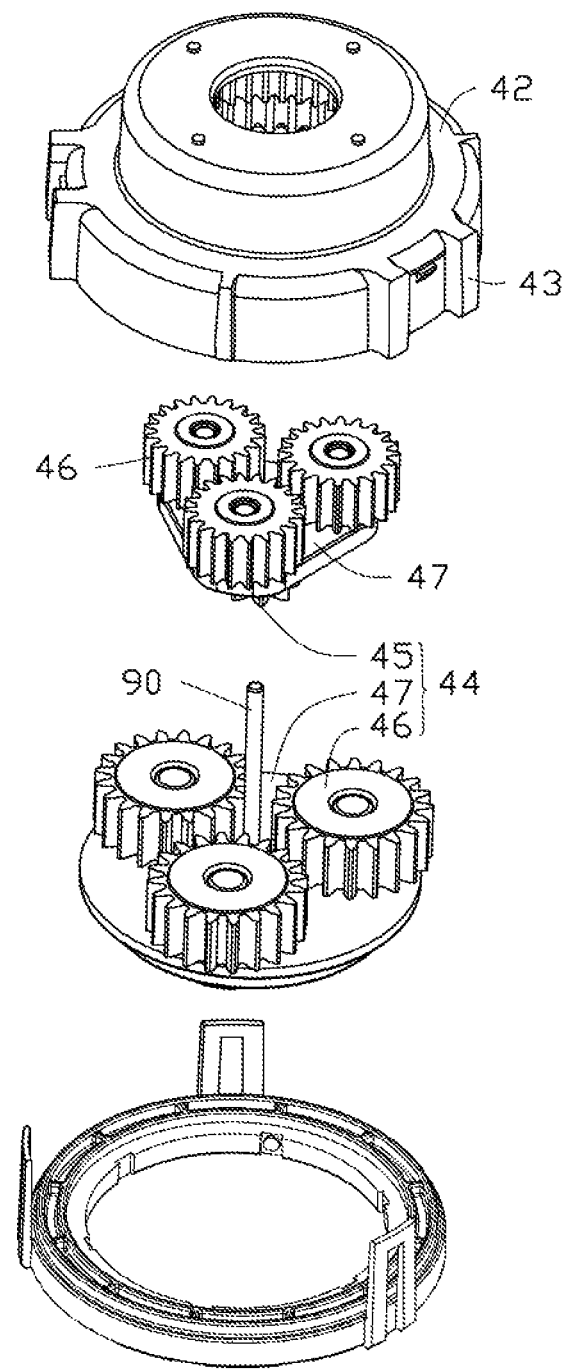
FIG. 5 is an exploded view of a planetary gear mechanism of the actuator of FIG. 1.
Figure 6:
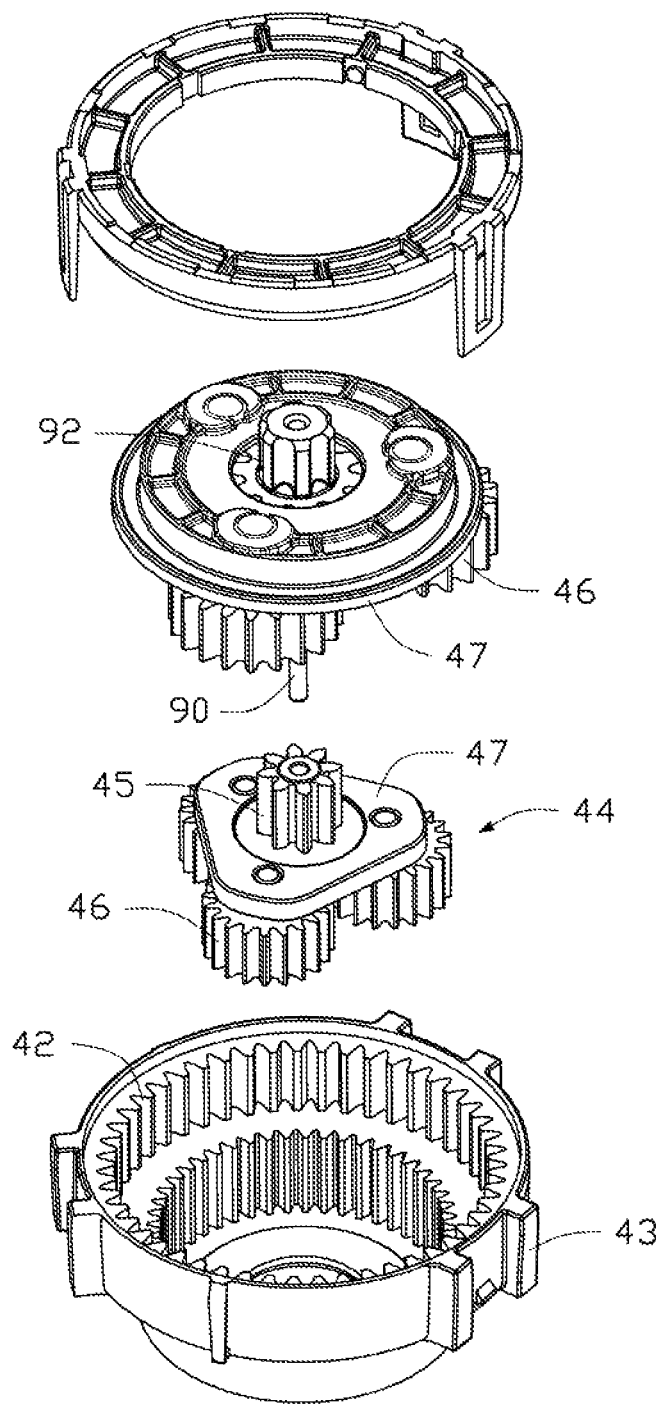
FIG. 6 illustrates the planetary gear mechanism of FIG. 5, viewed from another angle.
Figure 7:
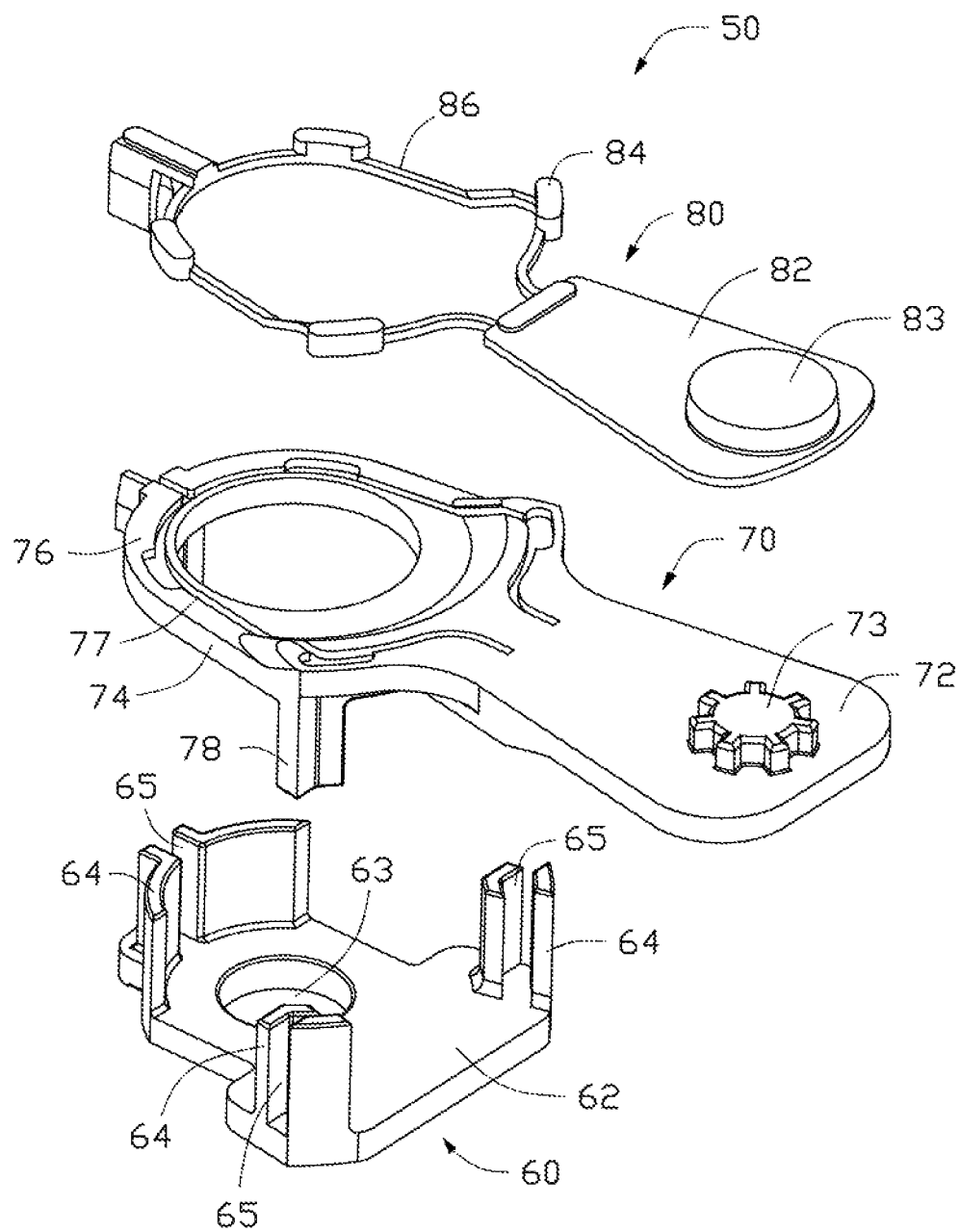
FIG. 7 is an exploded view of an isolation member of the actuator of FIG. 1.

Referring also to FIG. 5 and FIG. 6, the planetary gear mechanism 40 includes a gear housing 42 and a multi-stage planetary gear 44 received in the gear housing 42. The gear housing 42 is partially inserted into the annular space between the output wheel 38 and the follower wheel 34. This to some extent reduces the axial height of the space occupied by the planetary gear mechanism 40, which helps to reduce the axial size of the whole structure, especially when where is a large number of stages of the planetary gear mechanism 40.

In this embodiment, the planetary gear mechanism 40 includes a two-stage planetary gear that is connected in series with the output wheel 38 of the belt-wheel mechanism 30. A pivot axle 90 is used to ensure coaxiality between components. Each stage planetary gear 44 includes a sun gear 45, a plurality of planet gears 46 surrounding and engaging with the sun gear 45, and a planet carrier 47. The sun gear 45 is coaxial with the planet carrier 47, the pivot axle 90 passes through the planet carrier 47 and the sun gear 45 to establish a pivotable connection. The planet gears 46 are pivotably connected to the planet carrier 47 through respective pins. In this embodiment, the output wheel 38 acts as a first stage sun gear. A second stage sun gear 45 is integrally formed at a bottom end of a first stage planet carrier 47. An output element 92 is integrally formed on the planet carrier 47 of the second stage planetary gear 44, which acts as an output member for the whole actuator. After passing the gear housing 42 of the planetary gear mechanism 40 and the housing base 12 of the outer housing 10, the output element 92 is connected with an external element for torque output.

The gear housing 42 is supported on the housing base of the outer housing 10. For each stage planetary gear 44, the gear housing 42 forms a ring of internal teeth, known as a ring gear, engaging with all of the planet gears 46. Multiple locking blocks 43 protrude radially outwardly from an outer wall surface of the gear housing 42, and multiple locking slots 16 are correspondingly formed in the housing base 12 of the outer housing 10. The locking blocks 43 are engaged in the locking slots 16 of the housing base 12, preventing rotation of the gear housing 42. When the output wheel 38 rotates with the follower wheel 34 which is driven by the motor 20 via the transmission belt, the output wheel 38 drives the planet gears 46 of the first stage planetary gear that are engaged with the output wheel 38 to rotate. Because the planet gears 46 are meshed with the gear housing 42 which cannot rotate, the rotation of the planet gears 46 drives the planet carrier 47 and the second stage sun gear 45 to rotate. The rotation of the second stage sun gear 45 in turn drives the planet gears 46 of the second stage and the second stage planet carrier 47 to rotate, such that the output element 92 fixedly connected with the second stage planetary carrier 47 rotates to output a torque. An output speed of the planetary carrier 47 of each stage planetary gear 44 is far less than an input speed of the sun gear 45, such that the output speed is reduced step by step through the transmission of multi-stage planetary gear 44, and the high speed rotation of the motor 20 is finally converted into low speed rotation to be outputted. In an alternative embodiment, the planetary gear mechanism 40 may be of a single-stage, three-stage or more-stage planetary gear, and more stages bring better speed reduction result.

The isolation member 50 will now be described in more detail with reference to FIG. 7 through FIG. 10. The isolation member 50, on one hand, blocks the transmission of vibrations from the motor 20 and the planetary gear mechanism 40 during operation to the outer housing 10 and, on the other hand, determines a center-to-center distance between the driving wheel 32 and the follower wheel 34 of the belt-wheel mechanism 30 to prevent loosening of the belt 36. The isolation member 50 includes a first spacer 60, a second spacer 70, and a buffering element 80. The first and second spacers 60, 70 are rigid elements, such that the center-to-center distance between the driving wheel 32 and the follower wheel 34 can be defined. The buffering element 80 has a certain resiliency and may be made of a rubber material.

Figure 8:
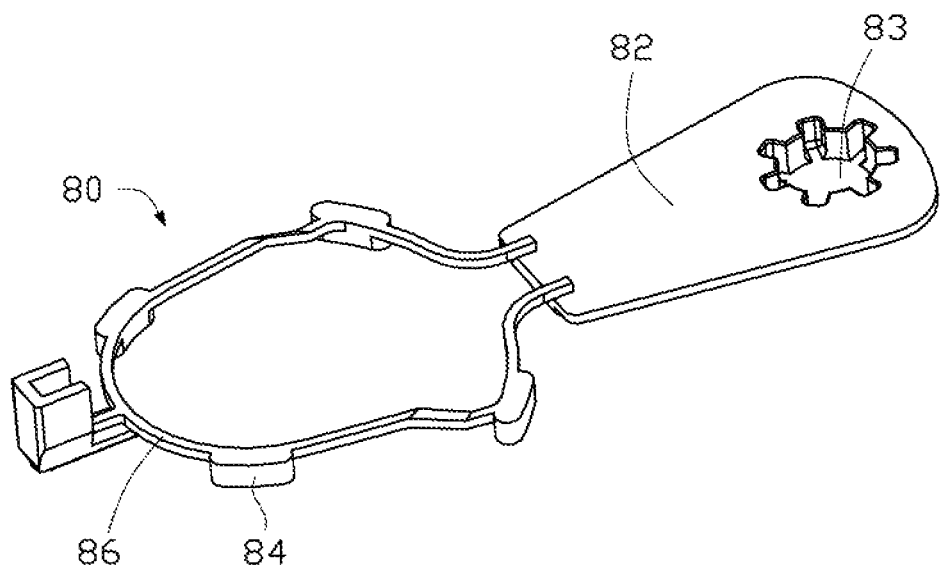
FIG. 8 illustrates a buffering element of the isolation member of FIG. 7, viewed from another aspect.
Figure 9:
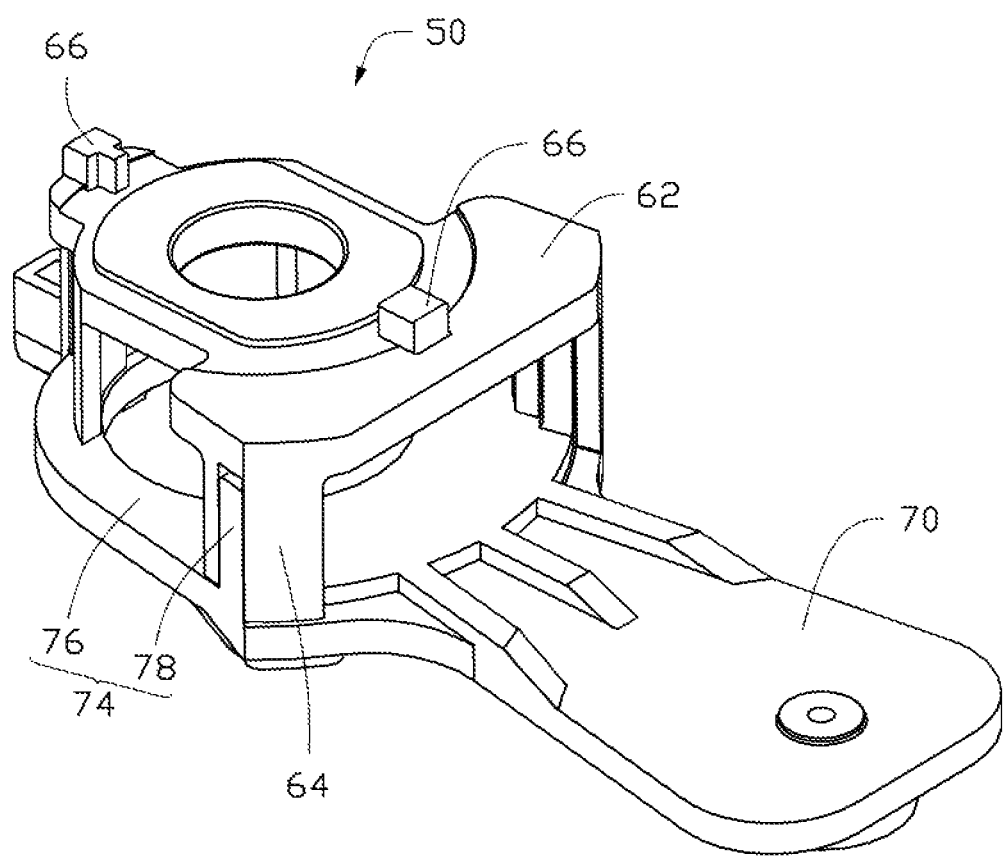
FIG. 9 is an assembled view of the isolation member of FIG. 7, viewed from another aspect.
Figure 10:
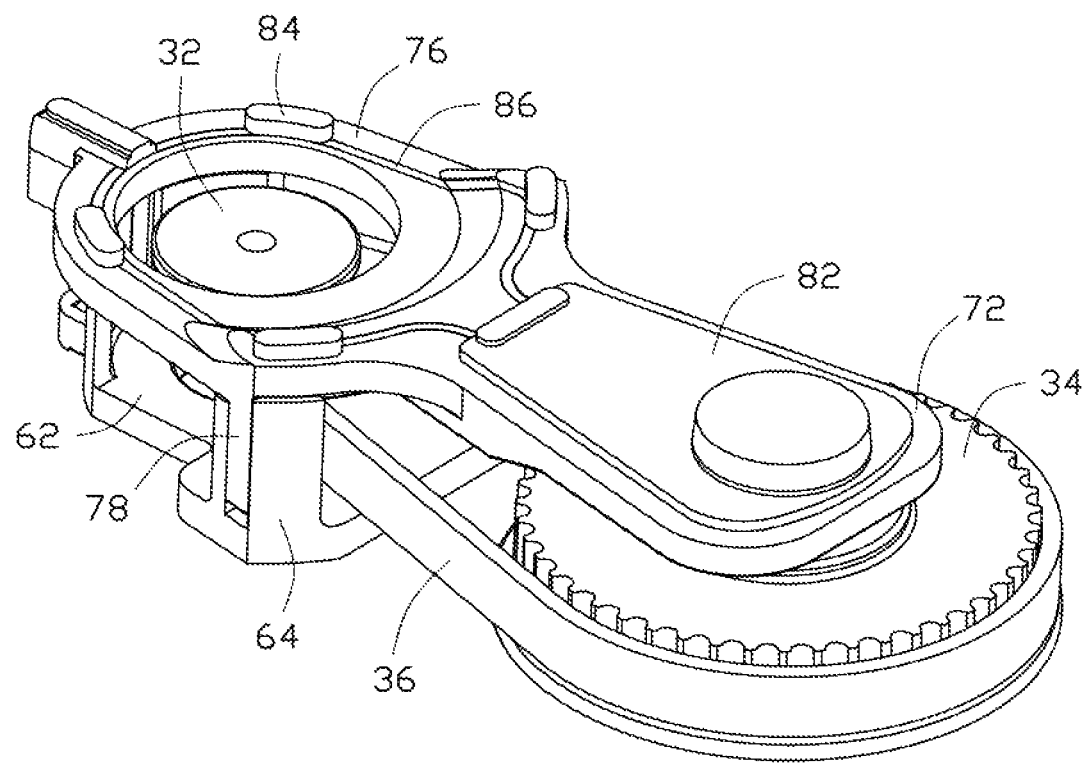
FIG. 10 is an assembled view of the isolation member and a belt-wheel mechanism of the actuator of FIG. 1.

The first spacer 60 is fixed on the motor 20, and the vibration produced by the motor 20 during operation is transmitted to the first spacer 60. The first spacer 60 includes a base plate 62 and locking arms 64 extending perpendicularly from an edge of a first surface of the base plate 62. The base plate 62 is overlappingly disposed on the end cap 24 of the motor 20. The base plate 62 defines a through hole 63 at a center thereof through which the shaft 22 of the motor 20 passes to connect with the driving wheel 32 of the belt-wheel mechanism 30. Two protruding blocks 66 extend perpendicularly from an edge of a second surface of the base plate 62, which engage with the two recesses 26 of the end cap 24, respectively, to position the first spacer 60 on the motor 20 thus preventing rotation of the first spacer 60 relative to the motor 20. As illustrated in FIG. 8, in this embodiment, the two protruding blocks 66 have different shapes. One protruding block 66 has a rectangular cross-section parallel to the base plate, and the other protruding block 66 has a T-shaped cross-section parallel to the base plate. Accordingly, the two recesses 26 of the end cap 24 of the motor are of a rectangular shape and a T-shape, respectively, thus providing mistake-proof orientation during assembly. In other embodiments, the number of the protruding blocks 66 can be another value, such as one, three or more, their shape can be the same or different, and the number and shape of the recesses 26 can vary accordingly. In some embodiments, the protruding blocks 66 may be formed on the end cap 24 with the recesses 26 formed in the first spacer 60, likewise allowing the first spacer 60 to be positioned by engagement between the protruding blocks 66 and the recesses 26.

The locking arms 64 are used to connect with the second spacer 70. Each locking arm 64 forms an insertion slot 65. In the present embodiment, there are three locking arms 64 that are located at the corners of an isosceles triangle. One locking arm 64 is located at the vertex of the isosceles triangle, remote from the planetary gear mechanism 40 and adjacent an inner wall surface of the outer housing 10, and the other two locking arms 64 are located at opposite ends of a base of the isosceles triangle, adjacent the planetary gear mechanism 40. After the assembly is completed, a distance between the two locking arms 64 at the base of the triangle is greater than a width of the transmission belt 36 in this position. The transmission belt 36 passes through the gap between the two locking arms 64 and sleeves around the driving wheel 32 that is connected onto the shaft 22 of the motor 20.

The second spacer 70 includes a spacing portion 72 that is disposed overlapping the follower wheel 34 of the belt-wheel mechanism 30, and a connecting portion 74 connected with the first spacer 60. The spacing portion 72 is shaped like a flat plate, with a protrusion 73 protruding outwardly from an area corresponding to the output wheel 38. A top end of the pivot axle 90 passes through the output wheel 38 and is inserted into the protrusion 73 of the spacing portion 72. The connecting portion 74 includes a circularring shaped body 76 and locking legs 78 extending downwardly from an edge of the body 76. The body 76 is overlappingly disposed on top ends of the locking arms 64, with the locking legs 78 being inserted into the insertion slots 65 of the locking arms 64, respectively, such that the first and second spacers 60, 70 are positioned and connected by the inserting connection between the locking arms 64 and the locking legs 78. After assembly, the first spacer 60 and the connecting portion 74 of the second spacer 70 cooperatively define a space. The base plate 62 and the body 76 are located at upper and lower sides of the space, the locking arms 64 and the locking legs 78 surround the space, the driving wheel 32 of the belt-wheel mechanism 30 is received in the space, the follower wheel 34 is located below the spacing portion 72 of the second spacer 70, and the transmission belt 36 passes through the two locking arms 64/locking legs 78 adjacent the planetary gear mechanism 40 to connect with the follower wheel 34. In another embodiment, the locking legs 78 of the second spacer 70 may form inserting slots, and the locking arms 64 of the first spacer 60 are inserted into the locking legs 78 of the second spacer 70 to assemble the first and second spacers 60, 70 together.

The buffering element 80 is disposed between the second spacer 70 and the top cover 14 of the outer housing 10. The vibration of the motor 20 and the planetary gear mechanism 40 is transmitted to the first and second spacers 60, 70, which is then buffered by the buffering element 80 and thus prevented from being transmitted to the top cover 14 of the outer housing 10. In this embodiment, the buffering element 80 includes a plate portion 82 laying on the spacing portion 72 of the second spacer 70 and a plurality of block portions 84. The plate portion 82 has a size slightly less than the size of the spacing portion 72. Corresponding to the protrusion 73 of the spacing portion 72, the plate portion 82 forms an outward-protruding hollow boss 83 that completely covers the protrusion 73. Preferably, as shown in FIG. 8, an outer periphery of the protrusion 73 of the second spacer 70 is formed with teeth, and an inner periphery of the boss 83 of the buffering element 80 is also formed with teeth that engage the teeth of the protrusion 73. The block portions 84 are disposed between the body 76 of the connecting portion 74 of the second spacer 70 and the top cover 14 and spaced from each in a circumferential direction of the body 76. The block portions 84 and the plate portion 82 are connected together by a line portion 86. In this embodiment, the body 76 forms a line slot 77 for receiving the line portion 86 to position the block portions 84. In this embodiment, the buffering element 80 and the second spacer 70 form an integral configuration by using an over-molding process. In another embodiment, the buffering element may also be separately formed and then assembled to the second spacer 70.

In the EPB actuator of the present invention, the motor 20 and the planetary gear mechanism 40 are spaced apart and arranged side by side. The transmission is achieved by using a belt-wheel mechanism 30, which can prevent the vibrations of the motor 20 and the planetary gear mechanism 40 from being transmitted there between and being superimposed. In addition, the isolation member 50 is disposed on the belt-wheel mechanism 30. The first and second spacers 60, 70 of the isolation member 50 absorb vibrations from the motor 20 and the planetary gear mechanism 40, respectively, and further buffer the vibrations by the buffering element 80, which prevents the vibrations from being transmitted to the outer housing 10. Therefore, the vibrations of the various components of the entire actuator are absorbed by the isolation member 50 and are not transmitted to the outside, thereby achieving low noise, and stable operation of the actuator. Furthermore, the isolation member of the present invention includes a first spacer and a second spacer having a simple structure and is easy to achieve automatic assembly.

In the description and claims of the present application, each of the verbs "comprise", "include", "contain" and "have", and variations thereof, are used in an inclusive sense, to specify the presence of the stated item or feature but do not preclude the presence of additional items or features.

It is appreciated that certain features of the invention, which are, for clarity, described in the context of separate embodiments, may also be provided in combination in a single embodiment. Conversely, various features of the invention which are, for brevity, described in the context of a single embodiment, may also be provided separately or in any suitable sub-combination.

The embodiments described above are provided by way of example only, and various other modifications will be apparent to persons skilled in the field without departing from the scope of the invention as defined by the appended claims.

The invention claimed is:

1. An actuator of an electric parking brake system, comprising:
    an outer housing;
    motor received in the outer hosing:
    a planetary gear mechanism received in the outer housing; and
    a belt-wheel mechanism, disposed in the outer housing and connecting the planetary gear mechanism with the motor, the belt-wheel mechanism comprising:
    a driving wheel connected to the motor;
    a follower wheel spaced from the driving wheel and connected with the planetary gear mechanism;
    a transmission belt extending around the driving wheel and the follower wheel; and
    an isolation member comprising a first spacer, a second spacer, and a buffering element, the first spacer being fixed relative to a central axis of the driving wheel, the second spacer being fixed relative to a central axis of the follower wheel, the second spacer being disposed above and assembled to the first spacer in an axial direction, and the buffering element being disposed between the second spacer and the outer housing, wherein the first spacer and the second spacer are separately formed and detachably engaged with each other.

2. The actuator of claim 1, wherein the first spacer includes a base plate fixed to the motor and locking arms extending from the base plate toward the second spacer, the second spacer includes locking legs extending toward the first spacer, the locking legs and the locking arms are engaged to position the first spacer relative to the second spacer.

3. The actuator of claim 2, wherein the second spacer includes a spacing portion and a connecting portion, the connecting portion includes a body and the locking legs extend from the body, and the spacing portion is disposed overlapping the follower wheel.

4. The actuator of claim 3, wherein the driving wheel of the belt-wheel mechanism is received between the base plate of the first spacer and the body of the second spacer, the locking legs and locking anus are spaced about the driving wheel, and the transmission belt passes between two adjacent locking legs/locking arms to extend around the driving wheel and the follower wheel.

5. The actuator of claim 3, wherein the buffering element includes a plate portion laying on the spacing portion and blocking portions disposed on the body, the body being ring shaped, and the blocking portions are arranged spaced apart in a circumferential direction of the body.

6. The actuator of claim 5, wherein the blocking portions are connected by a line portion, and the body forms a line slot in which the line portion is embedded.

7. The actuator of claim 3, wherein an output wheel is embedded in the follower wheel, the output wheel is connected with the planetary gear mechanism through a pivot axle, a top end of the pivot axle passes through the output wheel and is disposed within the spacing portion of the second spacer, a protrusion protrudes outwardly from an area of the spacing portion corresponding to the output wheel, the plate portion of the buffering element forms a boss corresponding to the protrusion, and the boss completely covers the protrusion.

8. The actuator of claim 7, wherein the follower wheel is a hollow structure including a circular-disc shaped end plate and a sidewall extending axially from an edge of the end plate, the transmission belt surrounds the sidewall, one end of the output wheel is inserted into the end plate, the other end of the output wheel extends into an inside of the sidewall, the other end of the output wheel has an outer diameter less than an inner diameter of the sidewall, with an annular space defined there between, the planetary gear mechanism partially extends into the annular space to engage with the output wheel.

9. The actuator of claim 7, wherein the output wheel forms a sun gear of the planetary gear mechanism.

10. The actuator of claim 2, wherein the motor includes a shaft, the shaft passes through a housing of the motor to connect with the driving wheel of the belt-wheel mechanism, the base plate defines a through hole at a center thereof through which the shaft passes, one of the base plate and the housing of the motor is formed with a recess, and the other of the base plate and the housing of the motor is formed with a protruding block which engages the recess.

11. The actuator of claim 2, wherein the locking arms form insertion slots, and the locking legs are inserted into the insertions slots of the locking arms.

12. The actuator of claim 2, wherein the locking legs form insertion slots, and the locking arms are inserted into the insertions slots of the locking legs.

13. The actuator of claim 1, wherein the transmission belt is a tooth belt, the follower wheel and driving wheel each have a number of teeth that engage the transmission belt, and the number of teeth of the driving wheel is less than the number of teeth of the follower wheel.

14. The actuator of claim 1, wherein the buffering element is integrally formed with the second spacer.

15. The actuator of claim 1, wherein the buffering element is molded to the second spacer.

* * * * *

UNITED STATES PATENT AND TRADEMARK OFFICE
CERTIFICATE OF CORRECTION

PATENT NO. : 9,835,213 B2  
APPLICATION NO. : 15/147533  
DATED : December 5, 2017  
INVENTOR(S) : Li Nan Li, Fa Yun Qi and Rui Feng Qin Page 1 of 1

It is certified that error appears in the above-identified patent and that said Letters Patent is hereby corrected as shown below:

On the Title Page

Item (72) should be amended as follows: second inventor Fa Yun Andreas Qi should be corrected to --Fa Yun Qi--.

Signed and Sealed this  
Third Day of March, 2020

Andrei Iancu  
*Director of the United States Patent and Trademark Office*